May 3, 1932. E. ADAMSON 1,857,077
INTERNAL COMBUSTION ENGINE
Filed Nov. 3, 1930
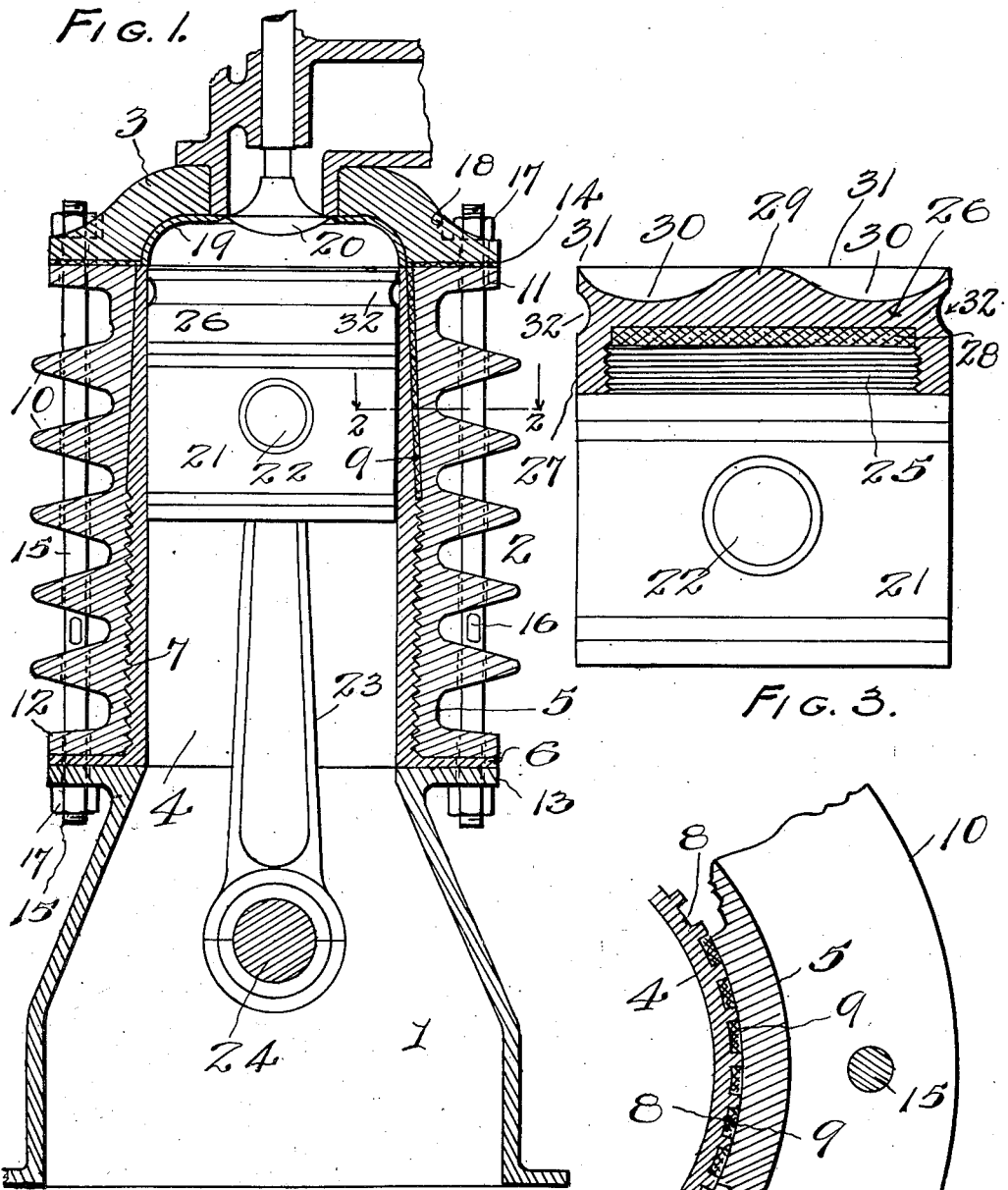
Inventor
ERNIE ADAMSON
By Thomas R. Harney
Attorney Patented May 3, 1932

1,857,077

UNITED STATES PATENT OFFICE

ERNIE ADAMSON, OF ROCKVILLE CENTER, NEW YORK

INTERNAL COMBUSTION ENGINE

Application filed November 3, 1930. Serial No. 493,104.

My present invention relates to improvements in internal combustion engines and involves the structural formation of the cylinder parts of the motor or engine as well as the piston which cooperates with the cylinder structure, for the purpose of increasing the efficiency of the engine or motor in several particulars.

In carrying out my invention I provide novel constructions and combinations of parts of the engine structure whereby the heat from the gases of combustion is radiated from the engine to increase the cooling efficiency of the engine; a durable liner is provided for the interior of the cylinder, and a jacket possessing a greater degree of heat conductivity than the liner encloses the latter; and co-acting means are provided between the dome or head of the cylinder and the head of the piston for insuring the necessary turbulence in the compression chamber for thoroughly commingling the ingredients of the charges of fuel mixture before their explosions.

While I have shown only a single cylinder, it will of course be understood that the invention is embodied in the usual type of multi-cylinder motors or engines. The invention consists in certain novel combinations and arrangements of parts as will hereinafter be more fully pointed out and claimed. In the accompanying drawings I have illustrated one complete example of the physical embodiment of my invention wherein the parts are combined and arranged according to the best mode I have thus far devised for the practical application of the principles of my invention.

Figure 1 is a vertical sectional view of a single cylinder of an engine or motor in which the features of my invention are embodied.

Figure 2 is an enlarged, fragmentary, sectional view, as at line 2—2 of Figure 1.

Figure 3 is an enlarged view of the piston, with part in section.

In Figure 1, which shows the general assembly and arrangement of parts of the engine structure, the numeral 1 indicates a usual type crank case; the engine block is designated as a whole by the numeral 2 and the engine head or dome shaped cylinder head is designated 3.

The engine block or the cylinder portion of the engine includes an inner liner 4 having a cylindrical bore and an outer casing or jacket 5, the liner being of heat resisting metal, which is hard and durable, as for instance nickel steel.

At is lower end the liner for the cylinder is fashioned with an integral, horizontal flange 6, and the lower cylindrical portion of the liner, above this flange, is fashioned with external screw threads 7 upon its periphery. These threads extend a suitable distance up from the bottom of the liner for threading into complementary internal threads fashioned in the lower bore of the jacket 5.

The liner is open at top and bottom, and the upper exterior periphery of the liner, above the threads 7, tapers from the threads to the top edge of the liner, to permit facile introduction of the liner into the jacket, and also to reduce the metal used in the liner. On the exterior tapered surface of the liner are arranged substantially longitudinal grooves 8, which are filled or packed with heat insulating material, as asbestos, at 9, before the liner is introduced into its jacket, and the jacket 5 of the liner is fashioned with a number of external fins as 10 for the radiation of heat and cooling of the engine structure.

The engine block is rigidly held between the crank case and the engine head, and the liner is rigidly held in the jacket by the use of tie-bolts 15 that pass through holes in the fins and also through holes in flanges 6 of the liner, upper flanges 11 of the jacket, lower flanges 12 of the jacket, and flanges 13 of the crank case, a usual gasket 14 being used between the engine block and the engine head as indicated.

The tie bolts are threaded at both ends, and to permit the use of a wrench on the bolts the latter are provided with flattened portions as 16, to hold the bolts rigid while their upper and lower nuts 17 are being turned. To accommodate the upper nuts 17 the engine head is provided with recesses as 18 (dotted lines) Figure 1, and it will be apparent that after the parts are assembled and the bolts passed through the alined openings in the enumerated parts, the upper and lower nuts may be tightened for the purpose of rigidly joining and holding in rigid relation the engine structure on the crank case. If the engine is to be dismantled or "taken down", or if only the head is to be removed, these operations may be accomplished with facility and convenience by removal of the required nuts, and of the bolts if necessary.

The jacket of the cylinder and the head of the engine are fashioned of metal possessing a higher degree of heat conductivity than the metal of the liner, and the interior of the dome of the engine head, forming the combustion chamber, is lined or coated with a hard durable heat-resisting metal indicated at 19, which metal may be of nickel and plated or otherwise secured on the copper surface of the interior of the dome of the head. A conventional valve 20 is indicated in the head of the engine, but it will be understood that the valves of the engine or motor may be located at any usual and desirable place.

In thus carrying out my invention the engine structure is fashioned as a comparatively light but strong and durable combination of elements of heat and wear resisting metals for the interior parts of the structure, and of metal of higher degree of heat conductivity than the lining parts, for the purpose of enhancing the cooling efficiency of the motor or engine.

The piston 21, wrist pin 22, connecting rod 23 and crank shaft 24 are indicated in Figure 1, and in Figure 3 a novel form of head 26 is shown threaded on the reduced boss 25 of the piston. This boss is provided with external threads, and the cap or head 26 of the piston is fashioned with an annular flange 27 having internal threads for threading on the boss to form an improved piston structure. The body 21 of the piston may be of aluminum while its cap or head 26 is fashioned of an alloy which is a good conductor of heat, as for instance an alloy of manganese and copper that will withstand the heat of combustion and expand and contract uniformly under differing conditions of heat within the cylinder. Between the face of the boss 25 and the interior of the piston head a packing as 28 may be interposed to insulate the head from the body of the piston, and for such insulation material such as asbestos may be used.

To enhance the turbulency of the gases in the compression chamber and thoroughly commingle the ingredients of the fuel charges, the top face of the piston head is provided with a central, rounded boss 29, and around the boss is arranged an annular depression or large groove 30. The outer surface of the groove, which is concave, merges in a thin edge at the outer periphery of the head, and an annular exterior groove 32 in the side of the head enhances the flexibility and resiliency of the edge 31. The annular edge 31 is thus fashioned wedge-shaped in cross section, and it responds to the differing thermal conditions in the cylinder with expansion and contraction of the metal, to form a close contact with the wall of the cylinder liner at all times.

The coaction of the novel shaped piston head with the dome shaped cylinder head, causes the intake charges to enter the cylinder and pass down the walls of the liner, and the charges are deflected on the curved piston head toward the center of the head and thence upward. This movement of the gas charge is enhanced on the compression stroke, forming a whirling ring in the combustion chamber. During this turbulent movement of the gases the ingredients of the charge are thoroughly commingled and prepared for the combustion of the fuel charge.

The annular side groove 32 in the piston head forms an oil space in which the lubricating oil for the piston and cylinder liner may be trapped and the oil is "wiped" along the wall of the liner as the piston reciprocates, the flexible, resilient edge 31 of the piston head forming a barrier against leakage of the oil above the piston head.

Having thus fully described my invention, what I claim as new and desire to secure by Letters Patent is:

1. The combination in an internal combustion engine with a head having a dome therein, of a piston having a central boss in its face and an annular, concave recess surrounding the boss, and the outer upwardly curved face of the recess merging into a thin annular edge on the face of the head of substantially the same exterior diameter as the piston.

2. The combination in an internal combustion engine with a head having a dome therein, of a piston having a central boss in its face and an annular concave recess surrounding the boss, the outer upwardly curved face of the recess merging into a thin annular edge on the face of the head of substantially the same exterior diameter as the piston, and the head being insulated by suitable material from the body of the piston.

3. The combination in an internal combustion engine with a head having a dome therein, of a piston having a central boss in its face and an annular concave recess surrounding the boss, the outer upwardly curved face of the recess merging into a thin annular edge on the face of the head of substantially the same exterior diameter as the piston, and said piston having at its side an annular exterior groove adjacent said edge.

4. The combination with a piston for an internal combustion engine of a head having a central boss and a concave face forming an annular recess surrounding the boss, the upwardly curved face of the recess merging into a thin annular edge on the face of the head of substantially the same exterior diameter as the piston.

5. A piston for use in an internal combustion engine comprising an attached head having a central boss and a concave face forming an annular recess surrounding the boss, the outer upwardly curved face of the recess merging into a thin annular edge on the face of the head, and said piston having an exterior, annular groove adjacent said edge.

In testimony whereof I have affixed my signature.

ERNIE ADAMSON.